United States Patent
Crosta et al.

(10) Patent No.: US 9,294,589 B2
(45) Date of Patent: Mar. 22, 2016

(54) HEADER COMPRESSION WITH A CODE BOOK

(75) Inventors: Simone Crosta, Porta San Giorgio (IT); Andrea Angelini, Milan (IT); Laura Clima, Milan (IT); Hakan Grenabo, Stenkullen (SE); Massimo Vincenzi, Milan (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 117 days.

(21) Appl. No.: 14/127,744

(22) PCT Filed: Jun. 22, 2011

(86) PCT No.: PCT/EP2011/060520
§ 371 (c)(1),
(2), (4) Date: Dec. 19, 2013

(87) PCT Pub. No.: WO2012/175132
PCT Pub. Date: Dec. 27, 2012

(65) Prior Publication Data
US 2014/0119377 A1    May 1, 2014

(51) Int. Cl.
H04N 7/12 (2006.01)
H04L 29/06 (2006.01)
H04L 12/743 (2013.01)
H04W 28/06 (2009.01)

(52) U.S. Cl.
CPC ............ *H04L 69/04* (2013.01); *H04L 45/7453* (2013.01); *H04L 69/22* (2013.01); *H04W 28/06* (2013.01)

(58) Field of Classification Search
CPC ..... H04L 69/04; H04L 45/7453; H04L 69/22; H04L 29/06; H04L 12/743
USPC ......... 370/350, 351, 352, 389–395, 396, 400; 375/240.1, 240.24, 246
See application file for complete search history.

(56) References Cited

U.S. PATENT DOCUMENTS

| | | | |
|---|---|---|---|
| 7,764,673 B1 * | 7/2010 | Asawa et al. | 370/389 |
| 2006/0235992 A1 | 10/2006 | Matias et al. | |
| 2008/0117906 A1 * | 5/2008 | Xie | 370/392 |
| 2008/0212566 A1 * | 9/2008 | Kim et al. | 370/352 |
| 2010/0098109 A1 | 4/2010 | Le Pennec et al. | |

* cited by examiner

*Primary Examiner* — Hanh N Nguyen
(74) *Attorney, Agent, or Firm* — Rothwell, Figg, Ernst & Manbeck, P.C.

(57) ABSTRACT

A method of transmitting data packets is disclosed. The method comprises acquiring a data packet to be transmitted; parsing the data packet to extract at least a part of its header; matching the extracted part of the header with header items stored in a code book database; preparing, if the extracted part of the header matches a header item stored in the code book database, an adapted data packet comprising a code from the code book corresponding to the match replacing the at least part of the header, and the rest of the data packet; and transmitting the adapted data packet, if the adapted data packet is prepared, or the data packet, if no adapted data packet is prepared. A corresponding method of receiving data packets is also disclosed. The method comprises receiving a data transmission; determining whether the data transmission comprises a compressed header indicator for a data packet with a compressed header; and if the data packet is determined to comprise a compressed header, performing the steps of: parsing the data packet to extract a code; looking up a code book database using the extracted code to find corresponding header data; and decompressing the data packet by replacing the compressed header indicator and the extracted code by the header data. A transmitter, receiver, communication system, and computer program for implementing the methods are also disclosed.

26 Claims, 9 Drawing Sheets

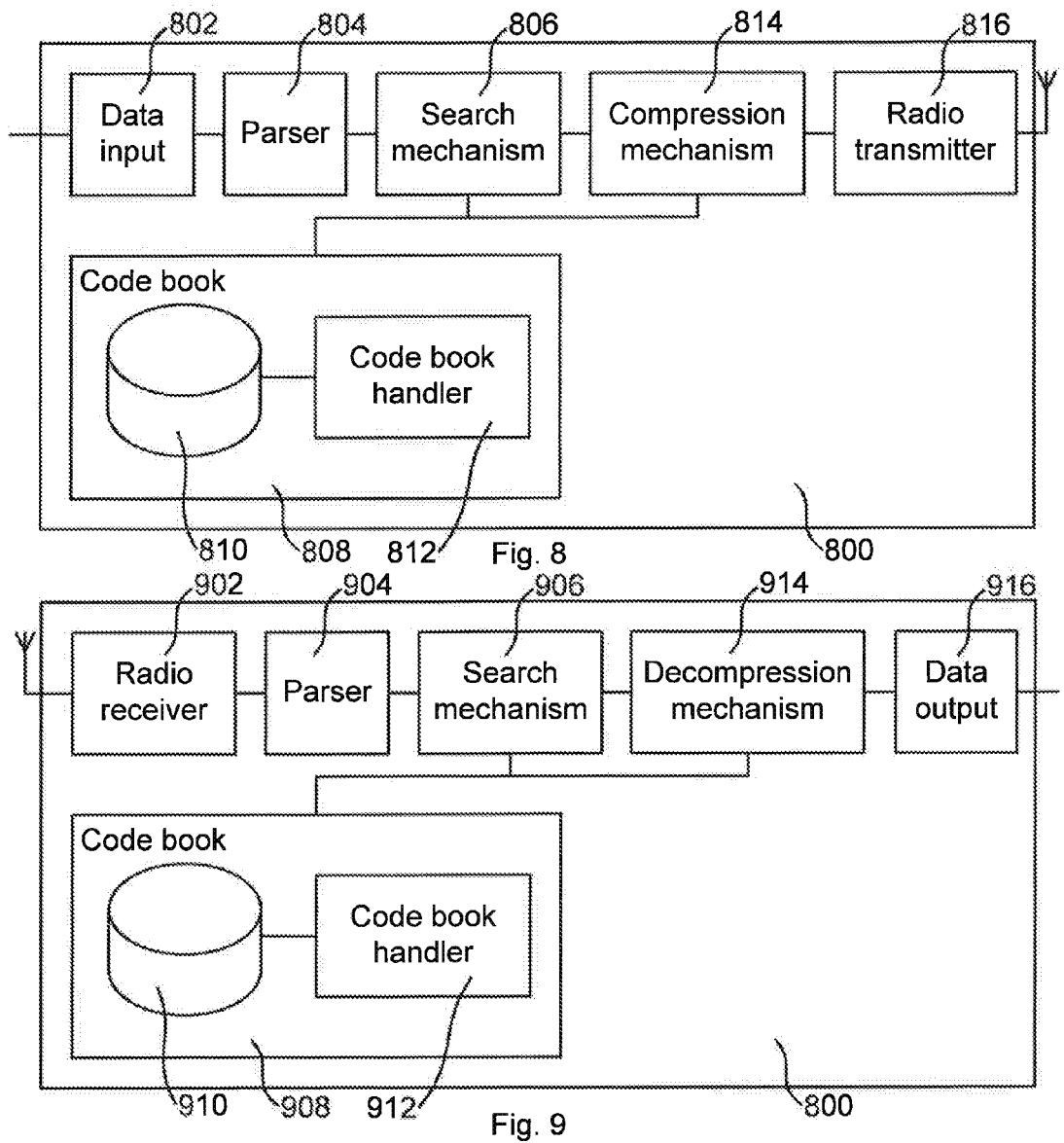
Fig. 8
Fig. 9
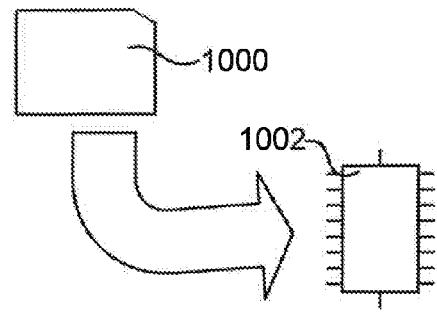
Fig. 10

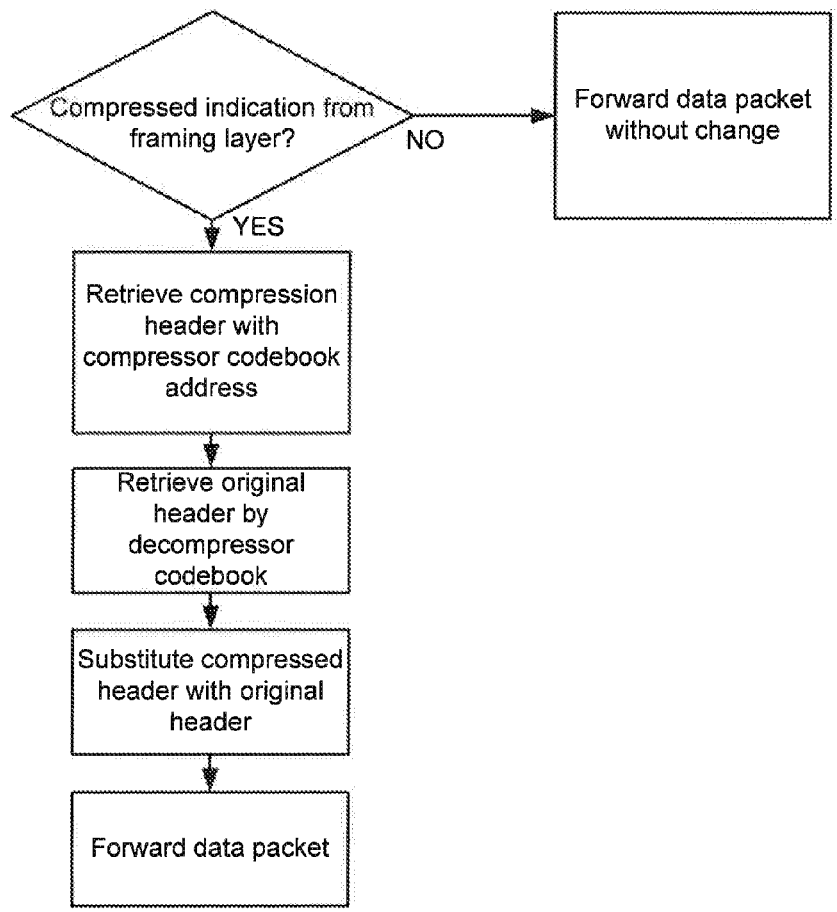
Fig. 17
Fig. 18
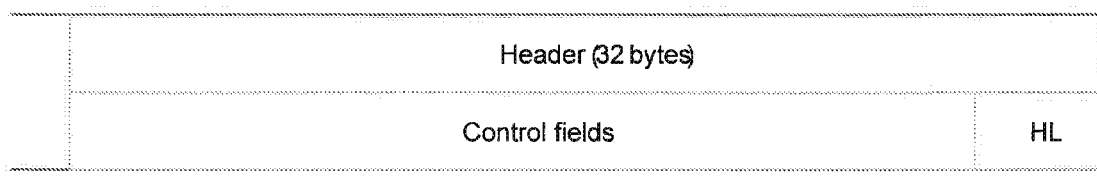
Fig. 19

HEADER COMPRESSION WITH A CODE BOOK

CROSS REFERENCE TO RELATED APPLICATION(S)

This application is a 35 U.S.C. §371 National Phase Entry Application from PCT/EP2011/060520 filed Jun. 22, 2011, the disclosure of which is incorporated by reference.

TECHNICAL FIELD

The present invention generally relates to an approach for transmission of data packets where bandwidth consumption is reduced where appropriate. In particular, the invention relates to a method of transmitting data packets, a method of receiving data packets, a method of data transmission, a transmitter, a receiver, a communication system and computer programs for implementing the methods.

ABBREVIATIONS

In the following disclosure, a number of abbreviations will be used. For the convenience of the reader, they are here presented in alphabetical order.
ACK Acknowledge
ATM Asynchronous transfer mode
BER Bit Error Rate
CRC Cyclic redundancy check
HL Header Length
HW Hardware
IETF Internet Engineering Task Force
IP Internet Protocol
LAN Local Area Network
LOS Loss of Signal
LUT Look-up Table
MAC Media Access Control
MBH Mobile Backhaul
MPLS Multi Protocol Label Switching
NACK Negative Acknowledge
OSI Open Systems Interconnection
PDH Plesiochronous Digital Hierarchy
RDI Remote Defect Indication
ROHC Robust Header Compression
RTP Real-Time Transport Protocol
SDH Synchronous Digital Hierarchy
SW Software
UDP User Datagram Protocol
UMTS Universal Mobile Telecommunication System
UTRAN UMTS Terrestrial Radio Access Network
VLAN Virtual LAN

BACKGROUND

When wired transmission schemes migrate to be transferred over radio networks, throughput and consumption of bandwidth are seldom optimised. It is therefore a desire to improve transmission over radio networks when using such transmission schemes.

SUMMARY

An object of the invention is to at least alleviate the above stated problem. The present invention is based on the understanding that a lot of header information used in the transmission schemes are invariant, at least to some degree or only a few sets of such header information are normally present. The inventors have found that a compression approach can be used. The suggested compression approach is flexible and can be considered to be, at least to some degree, self-learning.

According to a first aspect, there is provided a method of transmitting data packets comprising acquiring a data packet to be transmitted; parsing the data packet to extract at least a part of its header; matching the extracted part of the header with header items stored in a code book database; preparing, if the extracted part of the header matches a header item stored in the code book database, an adapted data packet comprising a code from the code book corresponding to the match replacing the at least part of the header, and the rest of the data packet; and transmitting the adapted data packet, if the adapted data packet is prepared, or the data packet, if no adapted data packet is prepared.

The method may further comprise performing, if the extracted part of the header does not match a header item stored in the code book database, the steps of: assigning a new header item in the code book comprising a code and the header; preparing a code book packet comprising the assigned code and the extracted part of the header; and transmitting the code book packet.

The method may further comprise performing, if the extracted part of the header does not match a header item stored in the code book database, wherein the code book database is representing the header items with hash values of the part of the corresponding header, the steps of: calculating a hash value for the extracted part of the header; determining whether a collision between the calculated hash value and any of the stored hash values of the code book database occurs by matching the calculated hash value to the stored hash values; and performing, if no collision is determined, the steps of: assigning a new header item in the code book comprising a code and calculated hash value of the header; preparing a code book packet comprising the assigned code and the extracted part of the header; and transmitting the code book packet. The stored hash values may further be assigned with an index, wherein if the calculated hash value matches a stored hash value, it is determined whether a further index is free for that hash value, wherein if no further index if free for that hash value, a collision is determined, and if a further index is free for that hash value, no collision is determined and the assigning of a new header item assigns the free index to the calculated hash value.

The method may further comprise receiving an acknowledgement signal for a previously sent code book packet; determining whether the acknowledgement signal indicates an ACKnowledgement or a Negative AcKnowledgement; and storing the assigned new header item in the code book database only if an ACKnowledgement is indicated.

The method may further comprise deleting a header item of the code book database if the header item has not been accessed for the preparing of an adapted data packet for a predetermined time, wherein the time is preferably measured in absolute time or number of packet transmissions. The method may further comprise, upon deleting a header item, transmitting a code book packet comprising a deletion notice for the header item.

The at least part of the header may be defined by invariant fields statistically determined to be occurring in a multitude of packets. The data packet may be an Ethernet packet or of type IEEE802.3 and derivations thereof, and the invariant fields may comprise Ethernet MAC destination address, Ethernet MAC source address, Ethernet type, zero, one or multiple additional VLAN customer tag, zero or one additional VLAN service tag, and zero, one or multiple additional MPLS tags.

According to a second aspect, there is provided a method of receiving data packets comprising receiving a data transmission; determining whether the data transmission comprises a compressed header indicator for a data packet with a compressed header; and if the data packet is determined to comprise a compressed header, performing the steps of: parsing the data packet to extract a code; looking up a code book database using the extracted code to find corresponding header data; and decompressing the data packet by replacing the compressed header indicator and the extracted code by the header data.

The method may further comprise performing, if the data transmission is determined not to comprise a compressed header indicator, the steps of: determining whether the data transmission comprises a code book packet; and if the data transmission comprises a code book packet, performing the steps of: extracting a code part and a header part from the code book packet; and storing in the code book database a header item in the code book database using the extracted code part and the header part.

The method may further comprise transmitting an acknowledgement signal for a received code book packet, the acknowledgement signal indicates an ACKnowledgement or a Negative AcKnowledgement, wherein the AcKnowledgement indicates successful storing of the new header item in the code book database.

The method may further comprise, upon receiving a code book packet comprising a deletion notice for a header item, deleting the header item of the code book database corresponding to the header item.

According to a third aspect, there is provided a method of data transmission comprising performing data transmitting according to the first aspect at a transmitting entity; and performing data receiving according to the second aspect at a receiving entity. It is to be noted that a communication node, or each communication node, may comprise both the entities for enabling communication in both directions, wherein for example two communication nodes can establish a dual directed communication link.

According to a fourth aspect, there is provided a transmitter arranged for transmitting data packets. The transmitter comprises a data input arranged to acquire a data packet to be transmitted; a parser arranged to parse the data packet to extract at least a part of its header; a code book database enabling storing of header items by association to codes, respectively, under control of a code book handler; a search mechanism arranged to match the extracted part of the header with header items stored in the code book database; a compressing mechanism arranged to, if the extracted part of the header matches a header item stored in the code book database, prepare an adapted data packet comprising a code from the code book corresponding to the match replacing the at least part of the header, and the rest of the data packet; and a radio transmitter arranged to transmit the adapted data packet, if an adapted data packet is prepared, or the data packet, if no adapted data packet is prepared.

The code book handler may be arranged to, if the extracted part of the header does not match a header item stored in the code book database, assign a new header item to the code book comprising a code and the header, prepare a code book packet comprising the assigned code and the extracted part of the header, wherein the radio transmitter is arranged to transmit the data packet and the code book packet. Alternatively, the code book handler may be arranged to, if the extracted part of the header does not match a header item stored in the code book database, wherein the code book database is representing the header items with hash values of the part of the corresponding header, calculate a hash value for the extracted part of the header, determine whether a collision between the calculated hash value and any of the stored hash values of the code book database occurs via the search mechanism matching the calculated hash value to the stored hash values, and, if no collision is determined, assign a new header item in the code book comprising a code and calculated hash value of the header, and prepare a code book packet comprising the assigned code and the extracted part of the header, wherein the radio transmitter is arranged to transmit the data packet and the code book packet. The stored hash values may further be assigned with an index in the code book database, wherein the code book handler is further arranged to, if the calculated hash value matches a stored hash value, determine whether a further index is free for that hash value, wherein if no further index if free for that hash value, a collision is determined, and if a further index is free for that hash value, no collision is determined and the code book handler assigns the free index to the calculated hash value.

The transmitter may further comprise a receiver arranged to receive an acknowledgement signal for a previously sent code book packet for determination whether the acknowledgement signal indicates an ACKnowledgement or a Negative AcKnowledgement, wherein the code book handler is arranged enable storing of the assigned new header item in the code book database only if an ACKnowledgement is indicated.

The code book handler may further be arranged to delete a header item of the code book database if the header item has not been accessed for the preparing of an adapted data packet for a predetermined time, wherein the time is preferably measured in absolute time or number of packet transmissions. The code book handler may further be arranged to, upon deletion of a header item, prepare a code book packet comprising a deletion notice for the header item, and the radio transmitter is arranged to transmit the code book packet.

The at least part of the header may be defined by invariant fields statistically determined to be occurring in a multitude of packets. The data packet may be an Ethernet packet or of type IEEE802.3 and derivations thereof, and the invariant fields may comprise Ethernet MAC destination address, Ethernet MAC source address, Ethernet type, zero or one additional VLAN customer tag, zero or one additional VLAN service tag, and zero or one additional MPLS tags.

According to a fifth aspect, there is provided a receiver for receiving data packets comprising a radio receiver arranged to receive a data transmission; a parser arranged to determine whether the data transmission comprises data packet with a compressed header, wherein, if the data packet is determined to comprise a compressed header, the parser is further arranged to parse the data packet to extract a code; a code book database enabling storing of header items by association to codes, respectively, under control of a code book handler; a search mechanism arranged to match the extracted code to header items stored in the code book database; a decompression mechanism arranged to, if a match was made, replace the compressed header indicator and the extracted code by header data acquired from the code book database such that the data packet with the header data is output.

The parser may be arranged to determine whether the data transmission comprises a code book packet and if the data transmission comprises a code book packet, extract a code part and a header part from the code book packet, wherein the code book handler is arranged to store an header item in the code book database using the extracted code part and the header part.

The receiver may further comprise a transmitter for transmitting an acknowledgement signal for a received code book packet, the acknowledgement signal indicating an ACKnowledgement or a Negative AcKnowledgement, wherein the AcKnowledgement indicates successful storing of the new header item in the code book database.

The code book handler may further be arranged to, upon receiving a code book packet comprising a deletion notice for a header item, delete the header item of the code book database corresponding to the header item.

According to a sixth aspect, there is provided a communication system for data transmissions comprising a transmitter according to the fourth aspect; and a receiver according to the fifth aspect.

According to a seventh aspect, there is provided a computer program for a transmitter for transmitting data packets, the computer program comprising instructions, which when executed by a processor of the transmitter, causing the transmitter to perform the method according to the first aspect.

According to an eighth aspect, there is provided a computer program for a receiver for receiving data packets, the computer program comprising instructions, which when executed by a processor of the receiver, causing the receiver to perform the method according to the second aspect.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

FIG. 8 is a block diagram schematically and functionally illustrating a transmitter according to embodiments.

FIG. 9 is a block diagram schematically and functionally illustrating a receiver according to embodiments.

FIG. 10 schematically illustrates a computer-readable medium for storing a computer program, which, as illustrated in the figure, can be downloaded in a processing device of a transmitter or receiver for, when executed, performing methods according to embodiments described with reference to FIGS. 6 and 7.

FIG. 17 illustrates a control signalling packet according to an embodiment.

FIG. 18 is a flow chart illustrating actions of a decompressor according to an embodiment.

FIG. 19 illustrates a decompressor codebook according to an embodiment.

DETAILED DESCRIPTION OF PREFERRED EMBODIMENTS

Figure 1:
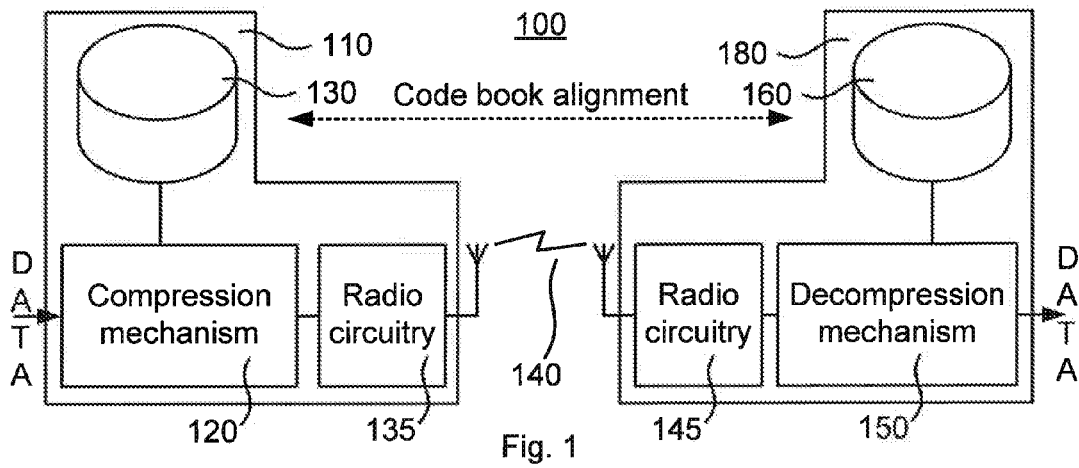
FIG. 1 schematically illustrates a communication system according to an embodiment.

FIG. 1 schematically illustrates a communication system 100 according to an embodiment. Data packet compression is applicable for example to a point-to-point hop between two different end nodes 110, 180.

Ingress data packets are received by a compression mechanism 120 on a first node 110, which either sends these packets towards a framing layer block as uncompressed with no any additional fields, or substitutes identified invariant fields in the data packets with shorter-length compressed headers.

The compression mechanism 120 determines whether to compress packets or not, based on the content of a compressor's code book 130.

The framing layer block performs an adaptation of the incoming traffic, spanning across multiple packets, also adding sideway information not necessarily pertaining to the single packets, in order to make the original traffic suitable for transmission over a radio link 140 by a transmitter 135 at the first node 110 to a receiver 145 at a second node 180.

An indication whether a packet is compressed or not, is added at framing level of processing; it need not be transported inside the single packet, therefore having the same, optimal efficiency for both compressed and uncompressed packets, avoiding additional overhead for the uncompressed packets transmission.

Uncompressed and compressed data packets are sent over a communication channel of the radio link 140 and received by the receiver 145, wherein on the second node 180, a decompression mechanism 150, based on information received by the framing layer is able to determine if a packet is compressed or not. In case the packet is uncompressed, the decompression mechanism 150 just forwards the packet without any change as egress data packets. In case the packet is compressed, the information included in the compressed header is sufficient to the decompression mechanism 150 to reconstruct the original data packets by substituting the compressed header with the original header resulting from processing the contents of a decompressor's code book 160 retrieved using the compressed header as a unique key.

Compressor and Decompressor include Codebooks 130, 160 which are the memory elements where the unique association between the original header and the compressed header is stored.

To reconstruct the original packet without errors, the decompressor's code book 160 needs to be aligned with the compressor's code book 130, at least for those entries used in communication between the first and second nodes 110, 180.

A suitable signalling protocol grants the alignment between code books. This is accomplished by transmitting control signalling packets, i.e. dedicated code book packets, including all the information related to the fields that will be compressed and the associated compressed headers.

The here disclosed protocol operates bidirectionally between a master side, i.e. the compression mechanism 120, and a slave side, i.e. the Decompression mechanism 150. Thus, for communication in the other direction, the illustration in FIG. 1 can be considered as a mirrored version of the depicted one.

The bidirectional signalling protocol runs independently in respect to the traffic data packet.

The here disclosed bidirectional signalling protocol provides an advantage with respect to the robustness towards errors, simplifies the handling of the traffic packets, avoids adding overhead fields to the uncompressed traffic packets and is more flexible in terms of association between compressible fields and compressed header. This signalling protocol is suitable to be implemented either in hardware or software, or be a mixed implementation.

Figure 2:
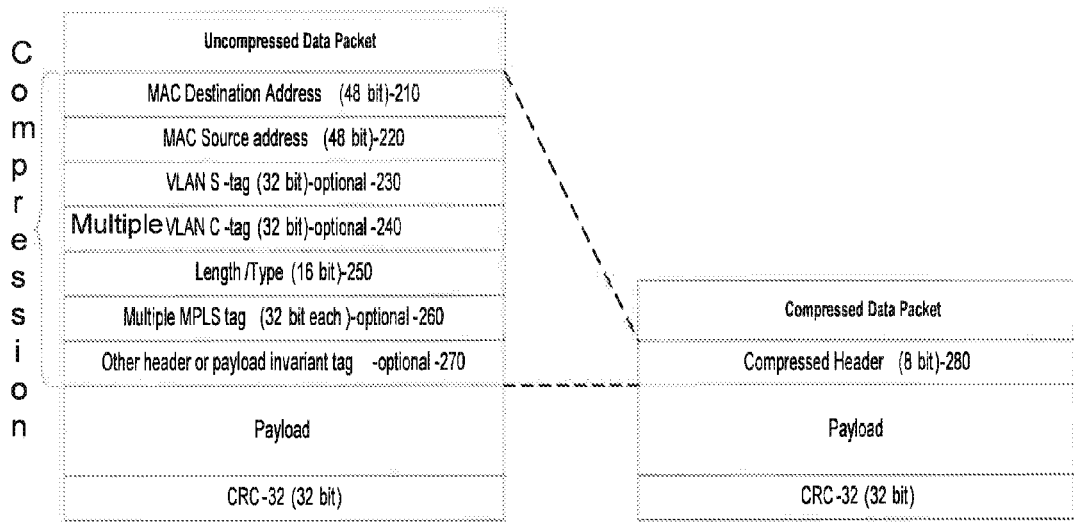
FIG. 2 illustrates an example of compression of invariant header information.

The compression method applies to different data packet protocols. FIG. 2 shows an example of a data packet structure in case of Ethernet frames.

In Mobile Backhaul Networks, several fields of the Ethernet Header can be considered invariant, with respect to the transmission over the point-to-point connections at different network levels.

Typically, a MAC destination address 210 comprising 48 bits, a MAC source address 220 comprising 48 bits, a Type field 250 comprising 16 bits, multiple VLAN tag 230 comprising 32 bits, if present, and multiple MPLS tag 260 comprising 32 bits, if present, can be considered constant for a time interval and makes them efficient to compress. These different fields are well known and defined in several standards, e.g. IEEE 802.1D (2004) MAC Bridges, IEEE 802.1q-2005 Virtual LANs, IEEE802.1ad Provider Bridges, RFC3031 MultiProtocol Label Switching Architecture and RFC3032 MPLS Label Stack Encoding, and will not be further explained here not to obscure the principles of the invention.

The skilled reader will appreciate that this compression method can be extended to other packet fields 270 that are invariant respect to the position and content, like for example fields of the IP header or other Layer 3 and Layer 4 protocol fields according to the OSI stack.

For this reason, the term packet is used as reference to traffic streams that includes all the possible traffic structure, independently by OSI layered stack classification.

Returning to FIG. 1, the incoming packets are parsed in the compression mechanism 120 and firstly classified according to e.g. the type, number and position of fields, irrespectively of their contents. At this stage, the compression mechanism 120 may or may not be instructed to classify patterns of fields as not suitable for compression. For those patterns set for exclusion from compression, no further processing is performed on the corresponding packet, which is forwarded to the framing layer along with the indication of uncompressed packet. For patterns of fields suitable for compression, the compression mechanism 120 determines a unique association between a key and a pattern. The key is unique in the sense that different contents in a pattern generating a unique key, or a single code 290, as illustrated in FIG. 3.

This compression method allows the compression of variable length parts of the traffic packet, using the same compressed header. Compressing all the fields in one single code is more efficient in terms of gain and complexity, than using different codes for each field of the traffic packet. The here disclosed invention does not place restrictions on how the key is generated, nor on the size of the resulting single code 290.

Figure 3:
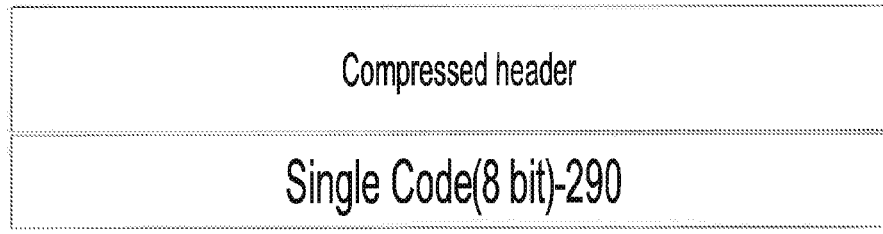
FIG. 3 illustrates an example of a compressed header according to an embodiment.

FIG. 3 shows a compressed header according to an embodiment where the single code occupies exactly one byte, thus allowing the transport of 256 different compressed headers. This embodiment could be easily extended to support an increased number of compressed headers. The number of different packets that can be feasibly compressed is a balance between the maximum number of different traffic packets related to the considered network topology and resource occupation in terms of memory and complexity. The limited size of the code book database in this example enables it to be implemented in a look-up table with fairly low complexity, which implies a fast implementation, e.g. with a solid state memory.

Figure 4:
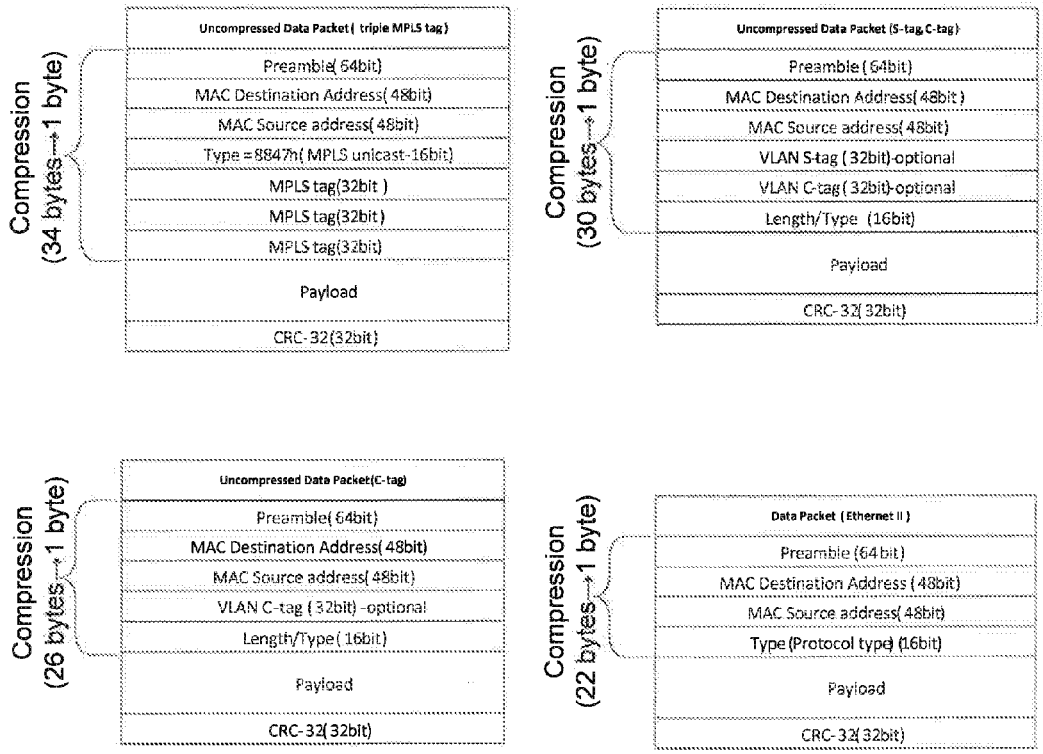
FIG. 4 illustrates different examples of compressible packet types.

FIG. 4 illustrates different examples of compressible packet types. Here, it can be seen that invariant fields that constitute the Ethernet packet formats, in case of 3 different MPLS tags included or a Service VLAN tag and a customer VLAN tag or a single Customer VLAN tag and a generic Ethernet II packet. In all these cases, also the preamble is taken into account, because it is included in the Ethernet packet that however need not be transmitted over the hop due to the fact that the framing delineation function is executed by the framing layer.

An Ethernet packet with 3 different MPLS tags includes a preamble comprising 8 bytes, a MAC destination address comprising 6 bytes, a MAC source address comprising 6 bytes, an Ethernet Type comprising 2 bytes, the MPLS tags comprising 4 bytes each and then the payload. Analyzing only the fields belonging to the Ethernet and MPLS protocol, it can be seen that it is possible to compress 34 bytes into 1 byte of compressed header. Similar considerations applies to Service VLAN tag, i.e. provider bridge, packet that, according to IEE802.1 ad, includes a preamble comprising 8 bytes, a MAC destination address comprising 6 bytes, a MAC source address comprising 6 bytes, a service V-LAN tag comprising 4 bytes and a customer V-LAN tag comprising 4 bytes and an Ethernet Type comprising 2 bytes per a total of 30 bytes compressible into 1 byte. The VLAN customer tag packet that, according to IEEE 802.1 q, includes a preamble comprising 8 bytes, a MAC destination address comprising 6 bytes, a MAC source address comprising 6 bytes, a customer V-LAN tag comprising 4 bytes and an Ethernet Type comprising 2 bytes per a total of 26 bytes compressible into 1 byte. Ethernet II packet includes a preamble comprising 8 bytes, a MAC destination address comprising 6 bytes, a MAC source address comprising 6 bytes, an Ethernet Type comprising 2 bytes. In this case, it is possible to compress 22 bytes into 1 byte.

Figure 5:
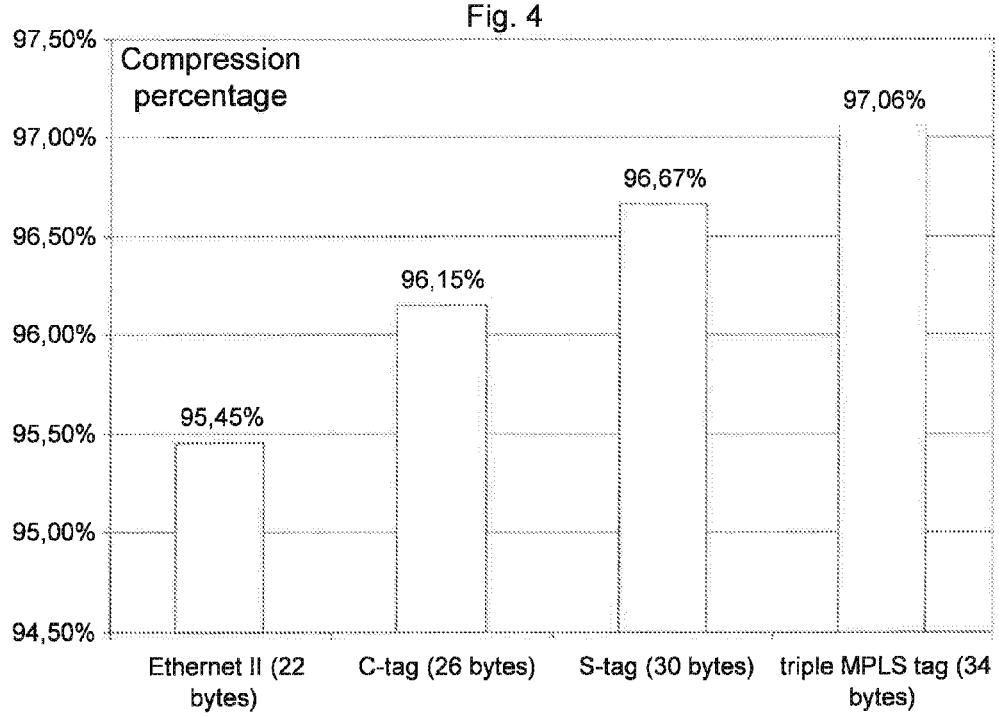
FIG. 5 is a chart illustrating examples of possible compression rates for different packet types.

FIG. 5 shows the compression percentage, related to the previous packets, calculated as the ratio "total length of invariant fields minus compressed header length" over "total length of invariant fields" for the examples given in FIG. 4. The total performance gain however depends on the frame length.

Figure 6:
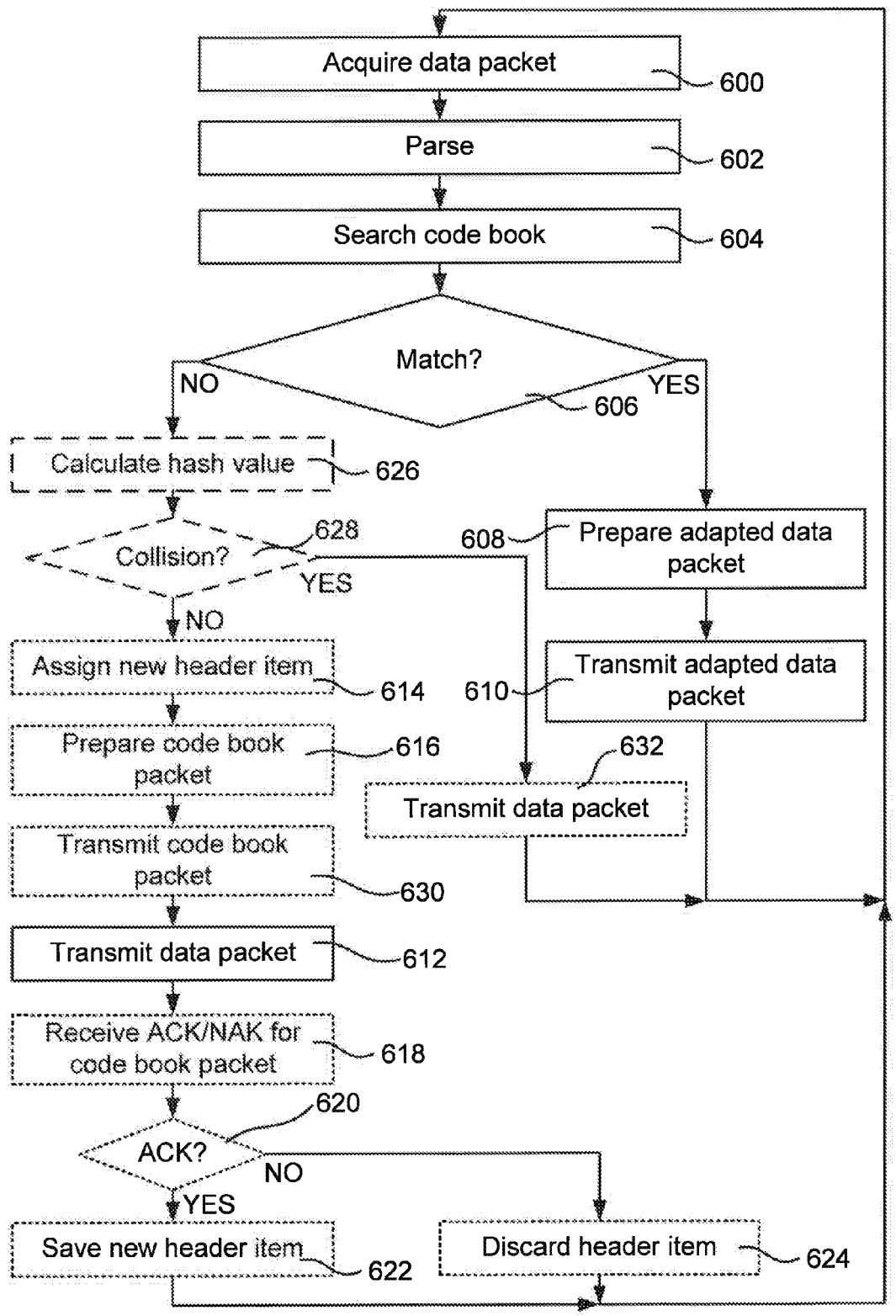
FIG. 6 is a flow chart illustrating a method of transmitting according to embodiments of the invention. Here, hashed/dotted boxes illustrate optional actions.

FIG. 6 is a flow chart illustrating a method of transmitting according to embodiments of the invention. It is to be noted that hashed/dotted boxes illustrate optional actions, as will be elucidated below. A data packet is acquired 600 at a data input, which data packet is to be transmitted over a wireless link. The data packet is parsed 602 to extract at least a part of its header, for example as demonstrated with reference to FIGS. 2 and 4. The extracted part of the header is searched 604 and matched 606 with header items stored in a code book database. Upon match 606, i.e. if the extracted part of the header matches a header item stored in the code book database, an adapted data packet is prepared 608 comprising a code from the code book corresponding to the match replacing the at least part of the header, and the rest of the data packet, for example as illustrated in FIG. 2. The adapted data packet is then transmitted 610. In case, there was no match 606, a data packet is transmitted 612 without adaptation.

If the extracted part of the header does not match 606 a header item stored in the code book database, the procedure can proceed with assigning 614 a new header item in the code book comprising a code and the header. A code book packet is then prepared 616 comprising the assigned code and the extracted part of the header, and both the code book packet and the data packet are transmitted 630 and 612.

The procedure can also comprise receiving 618 an acknowledgement signal for a previously sent code book packet, wherein it is determined 620 whether the acknowledgement signal indicates an ACKnowledgement or a Negative AcKnowledgement. The procedure can thus include storing 622 the assigned new header item in the code book database only if an ACKnowledgement is indicated. If a NAK is received, the header item is discarded 624. On the other hand, if this optional procedure of checking ACK/NAK is not utilised, the assigned new header item may be stored 622 in the code book database, and no discarding is used in this alternative. To avoid compressor and decompressor codebook misalignments in this case a codebook packet retransmission could be foreseen.

In some embodiments, the search 604 is performed by a hashing algorithm. A hashing algorithm application allows supporting a larger set of compressible headers. The transmitter compression mechanism normally works on real-time traffic and traffic rate can limit the possibility to execute a look-up of the large compressible header among the entries in the codebook, if the number of entries is high. In case of for example 10 Gb/s Ethernet interface, the look-up allowed time is limited by the packet arrival time, which in case of short packets, i.e. 64 bytes length is only 512 ns. A search engine for finding a matching code needs to complete a look-up before the next packet arrives in order to handle the full ingress traffic rate. A hashing function allows shrinking a very large-sized compressible header into a small sized hash key, decreasing the time needed for the look-up. In some embodiments, the compressible header is converted by a hashing function into a hash key with a much lower number of bits than the original pattern and is then used to address a relatively small look-up table (LUT). This LUT contains descriptors including pointers to the Compressor Codebook.

The compressible header is sent to the hashing block that converts the maximum ingress A bytes in a hash key of B bits, mapping all the possible compressible headers in $2^B$ hash keys. Thus, a hash value is calculated 626. Compressible headers can have variable length and also the number of headers with length shorter than A bytes belong to the total possible headers. In case the length difference between the compressible headers length is relevant, e.g. 4 bytes, $2^{(8*A)}$ is a good approximation for all the possible headers.

Mapping $2^{(8*A)}$ in $2^B$ hash keys where $B<<8*A$ can cause different headers to be mapped on the same hash key. In this case a collision happens. Chosen hashing algorithm must be simple in order to be easily hardware implemented and give a response in a short time when calculation 626 is performed by the compression machine that works on real time traffic and should grant a uniform distribution to decrease the collision probability.

A hashing function can generate a fixed-length hash key, which is very easily handled in hardware, irrespectively of the length of the input message, which is the compressible header in this application. The collision probability intrinsic to a hashing algorithm decreases by increasing the number of B bits used to represent the hash key and depends on the maximum different number of incoming compressible headers. Dimensioning B correctly implies that the collisions probability can be lowered at will.

A collision probability better than 1% can easily be reached with this method, i.e. with short key lengths, and it can be designed to be negligible by simply increasing the key length. It must be noted that in case of collisions in the hashing algorithm, no errors are introduced on the traffic streams, because they will preferably be sent as uncompressed.

In some embodiments, a hashing algorithm handling multiple collisions and based on CRC is chosen. Other, different algorithms could also be chosen. In some embodiments, the hash key is used as a base address on a look-up table, wherein the correspondent LUT entry includes the address of the compressor's code book where the compressible header is stored.

The compressor LUT allows memory saving. The hash keys $2^B$ are usually greater than the maximum number of entries in the compressor's code book. Each entry in the code book requires memory to store the compressible header, i.e. A bytes, and some control fields while the LUT entry requires memory to store only the compressor's code book address and some control fields.

The search engine checks if the stored entry is equal to the incoming header. If the entry is not present in the LUT, the search engine forwards the packet towards a compressor assembler with the indication to send it as uncompressed. At the same time, the search engine sends to a compressor table manager a request to add a new entry in the compressor's code book, providing the compressible header as well. The compressor table manager implements the protocol and signalling needed to grant the codebooks alignment.

If the entry is present in the LUT, then search engine retrieves the compressor's code book address from the LUT and retrieves the corresponding entry from the code book. Then the search engine matches the entry from the code book against the compressible header.

If the compressor's code book's entry does not match with the compressible header, that means a hashing collision happened, where two different compressible headers generated the same hash key. In this unlikely case, the search engine forwards the packet towards the compressor assembler with a negative compression indication. The compressor assembler therefore forwards the packet as is, along with its negative compression indication to the framing layer. This is illustrated by collision checking step 628 and data packet transmission 632.

If the compressor's code book entry does match 606 the compressible header, the search engine sends to the assembler a positive compression indication, specifying the format of the compressible header and the compressor's code book address that is used 608 as compressed header.

In the managing of the code book, there are some options for not only keeping the code book aligned with code books of other transmission entities, but also for keeping it updated for likely traffic. For example, a header item of the code book database can be deleted if the header item has not been accessed for the preparing of an adapted data packet for a predetermined time. The time is preferably measured in absolute time or number of packet transmissions. Upon such deletion of a header item, since the code book should be aligned with other entities, a code book packet comprising a deletion notice for the header item can be transmitted to those entities.

For the updating and management of the code book database, a statistical analysis approach can be used for determining where compression gives the most effect. It is found that data packets particularly suitable for the approach is an Ethernet packet or of type IEEE802.3 and derivations thereof. Here, the invariant fields comprise Ethernet MAC destination address, Ethernet MAC source address, Ethernet type, zero or multiple additional VLAN customer tag, zero or one additional VLAN service tag, and zero or multiple additional MPLS tags, and such.

Figure 7:
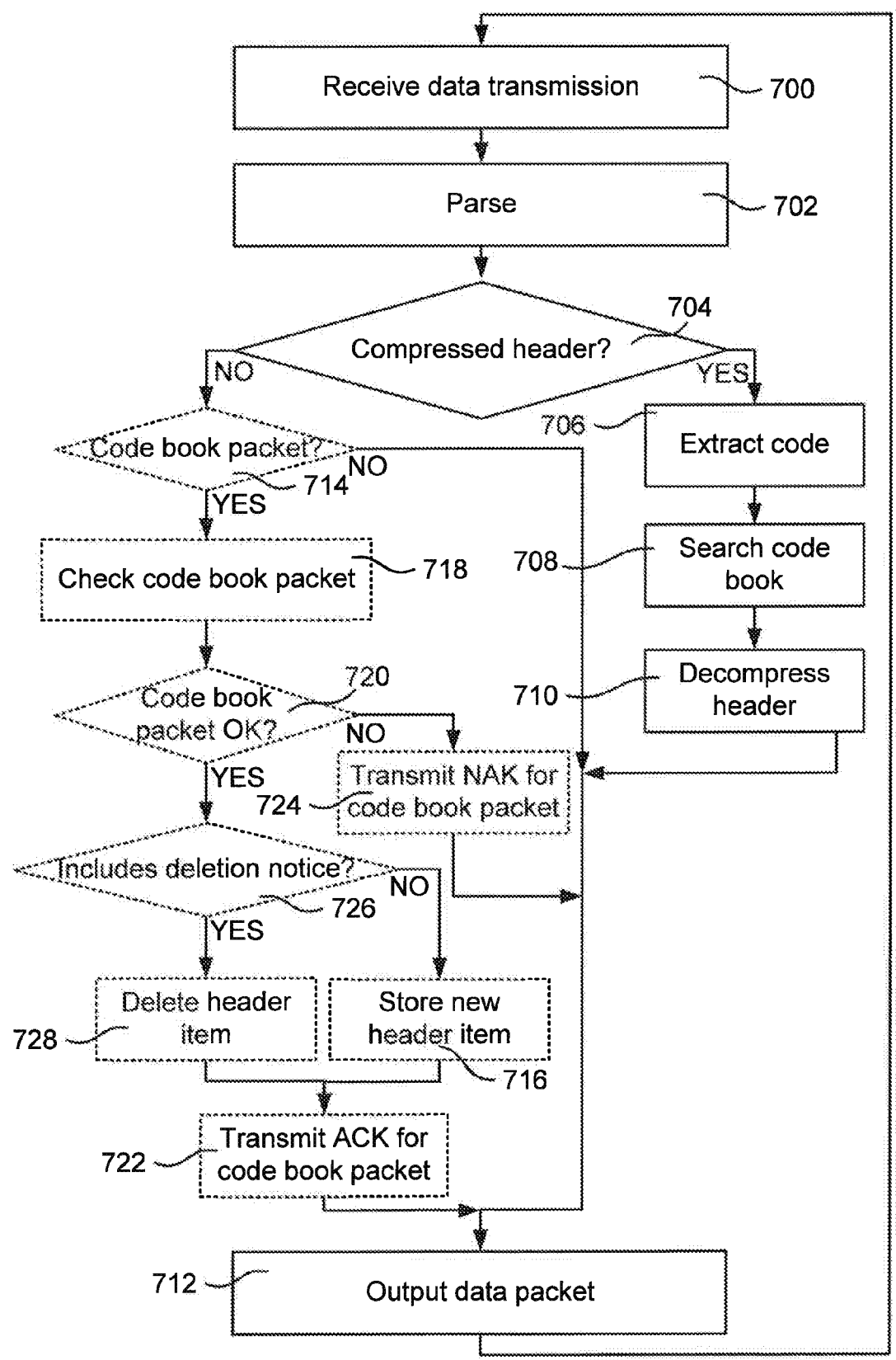
FIG. 7 is a flow chart illustrating a method of receiving according to embodiments of the invention. Here, hashed/dotted boxes illustrate optional actions.

FIG. 7 is a flow chart illustrating a method of receiving according to embodiments of the invention. Here, dotted boxes illustrate optional actions, as will be elucidated below. Further, the method of receiving is particularly adapted for reception from a transmitting entity employing the features elucidated with reference to FIG. 6. The method comprises receiving 700 a data transmission e.g. over a radio link from the transmitting entity. Here, receiving means the acts of processing one or more antenna signals, detecting, demodulating, decoding symbols, etc. as normally performed by a radio receiver. The procedure continues by determining whether the data transmission comprises a compressed header indicator for a data packet with a compressed header. This is performed by parsing 702 the data transmission and looking for an indicator whether the transmission employs compressed headers. Thus, if the data packet is determined to comprise a compressed header upon checking 704, the transmission is processed by parsing the data packet to extract 706 a code. This parsing can be a separate action or joint with the parsing 702 for compressed header indication. The extracted code is used for looking up a code book database to search 708 for corresponding header data, which is used for decompressing 710 the data packet by replacing the compressed header indicator and the extracted code by the header data. The data packet, comprising the header data and the received payload, etc., i.e. non-compressed parts, is then output 712. In case there is found an indicator during parsing 702 that the transmission is sent without compressed headers, or if no indication is found, i.e. the transmission was made without using any compression features for headers, the data packet is output 712 without any further header decompression processing.

Optionally, if the data transmission is determined not to comprise a compressed header indicator, which can be an indication of a new code book item being attached to the transmission, the procedure can also comprise determining 714 whether the data transmission comprises a code book packet. If the data transmission is found to comprise a code book packet, a code part and a header part is extracted from the code book packet, and then a new item is stored in the code book database using the extracted code part and the header part. Further optionally, upon reception of a code book packet, the procedure can include checking 718 if the code book packet was properly received, e.g. by CRC, or if any other issues occurred that prevent application of the new code book entry such as not enough available memory space in code book database. Based on the checking 718, 720, an acknowledgement signal for the received code book packet is provided by either transmitting an ACKnowledgement 722 or transmitting a Negative ACKnowledgement 724, wherein the ACKnowledgement indicates successful storing of the new header item in the code book database.

Further optionally, upon receiving a code book packet, the code book packet can comprise a deletion notice for a header item. The code book packet can therefore be checked 726 whether it comprises such notice, and deleting 728 the header item of the code book database corresponding to the header item if the checking 726 indicates a deletion notice.

The deletion notice can also be a master deletion notice, which causes all entries in code book database to be deleted. This is preferably used at system setup or reset.

FIG. 8 is a block diagram schematically and functionally illustrating a transmitter 800 arranged for transmitting data packets. The transmitter 800 is particularly adapted to implement the approach described with reference to FIG. 6. The transmitter 800 comprises a data input 802 arranged to acquire a data packet to be transmitted and a parser 804 arranged to parse the data packet to extract at least a part of its header which is suitable for compression. The transmitter 800 comprises a code book element 808, which comprises a code book database 810 which enables storing of header items by association to codes, respectively, under control of a code book handler 812. A search mechanism 806 is arranged to match the extracted part of the header with header items stored in the code book database. As an option, a hashed value, as has been described above, can be used instead of using the extracted part directly. A compression mechanism 814 is arranged to, if the extracted part of the header matches a header item stored in the code book database, prepare an adapted data packet comprising a code from the code book corresponding to the match replacing the at least part of the header, and the rest of the data packet. Thus, an adapted packet as for example the one illustrated to the right in FIG. 2 will be formed from the packet input by the data input 802, i.e. a packet for example as illustrated to the left in FIG. 2. The transmitter 800 also comprises a radio transmitter 816 arranged to transmit the adapted data packet, if an adapted data packet is prepared, or the unchanged data packet, if no adapted data packet is prepared.

The code book handler 812 can be arranged to, if the extracted part of the header does not match a header item stored in the code book database, assign a new header item to the code book comprising a code and the header, prepare a code book packet comprising the assigned code and the extracted part of the header, wherein the radio transmitter is arranged to transmit the data packet and the code book packet. Thus, the code book handler 812 plays an important role in both alignment and update of the code book, as has been demonstrated above. Further, the code book handler 812 can be arranged to take care of the hashed value approach demonstrated above.

The radio transmitter 816 may be a transceiver such that bidirectional communication enables reception of an acknowledgement signal for a previously sent code book packet for determination whether the acknowledgement signal indicates an ACKnowledgement or a Negative AcKnowledgement, wherein the code book handler is arranged enable storing of the assigned new header item in the code book database only if an ACKnowledgement is indicated.

FIG. 9 is a block diagram schematically and functionally illustrating a receiver 900 for receiving data packets. The receiver 900 comprises a radio receiver 902 arranged to receive a data transmission, a parser 904 arranged to determine whether the data transmission comprises data packet with a compressed header, wherein, if the data packet is determined to comprise a compressed header, the parser is further arranged to parse the data packet to extract a code. A code book 908 comprises a code book database 910 and a code book handler 912, where the code book database 910 enables storing of header items by association to codes, respectively, under control of the code book handler 912. A search mechanism 906 is arranged to match the extracted code to header items stored in the code book database 910 such that a decompression mechanism 914 can, if a match was made, replace the compressed header indicator and the extracted code by header data acquired from the code book database such that the data packet with the header data is output. The parser 904 can be arranged to determine whether the data transmission comprises a code book packet and if the data transmission comprises a code book packet, extract a code part and a header part from the code book packet, wherein the code book handler 912 is arranged to store an header item in the code book database using the extracted code part and the header part. The radio receiver 902 can be a transceiver, i.e. also comprising a transmitter for transmitting an acknowledgement signal for a received code book packet, the acknowledgement signal indicating an ACKnowledgement or a Negative AcKnowledgement, wherein the AcKnowledgement indicates successful storing of the new header item in the code book database. The ACK/NAK signal is preferably generated by the code book handler 912. The code book handler 912 can further be arranged to, upon receiving a code book packet comprising a deletion notice for a header item, delete the header item of the code book database corresponding to the header item. The notice can also be a master deletion instruction which causes the code book handler 912 to delete all items of the code book database 910.

The receiver 900 resembles the transmitter 800 illustrated in FIG. 8 in many ways, and it can be seen that for a transceiver, i.e. a communication node performing transmitting and receiving, many of the elements can have joint elements. Such a transceiver comprises a radio transceiver which functions as both the radio transmitter and the radio receiver. The transceiver comprises both a compression mechanism and a decompression mechanism connected to data input and data output, respectively. The other elements, i.e. the parser, the search mechanism and the code book can be elements common for both reception/decompression and transmission/compression in the transceiver.

In the above demonstrated transmitter, receiver and transceiver, the code book handler 812, 912 is given a number of functions. In this disclosure, these functions have also been given more specific element names, such as compressor table manager, compressor assembler, etc. It is the nature of these elements to be implemented as a mix of hardware and software, and it is sometimes hard to see bounds of an element. Therefore, the term code book handler should be construed in the light of this disclosure and its benefit is in its functions.

FIG. 10 schematically illustrates a computer-readable medium for storing a computer program, which, as illustrated in the figure, can be downloaded in a processing device of a transmitter or receiver for, when executed, performing methods according to embodiments described with reference to FIGS. 6 and 7. Thus, since methods according to the present invention is suitable for implementation with aid of processing means, such as computers and/or processors, especially for the case where the transmitter or receiver is computer controlled. Therefore, there is provided computer programs, comprising instructions arranged to cause the processing means, processor, or computer to perform the steps of any of the methods according to any of the embodiments described with reference to FIG. 10. The computer programs preferably comprises program code which is stored on a computer readable medium 1000, as illustrated in FIG. 10, which can be loaded and executed by a processing means, processor, or computer 1002 to cause it to perform the methods, respectively, according to embodiments of the present invention, preferably as any of the embodiments described with reference to FIG. 10. The computer 1002 and computer program product 1000 can be arranged to execute the program code sequentially where actions of the any of the methods are performed stepwise. The processing means, processor, or computer 1002 is preferably what normally is referred to as an embedded system. Thus, the depicted computer readable medium 1000 and computer 1002 in FIG. 10 should be construed to be for illustrative purposes only to provide understanding of the principle, and not to be construed as any direct illustration of the elements.

Figure 11:
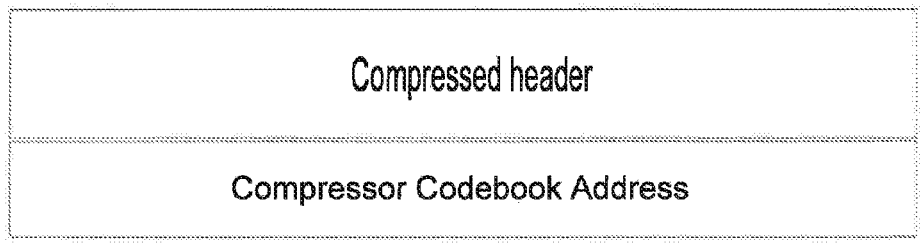
FIG. 11 illustrates a compressed header according to an embodiment.

FIG. 11 shows the format of Compressed header in an embodiment where the maximum number of streams is limited to 256. In such case, notably, the Compressor Codebook address and the Single Code byte used as compressed header are just the same.

Figure 12:
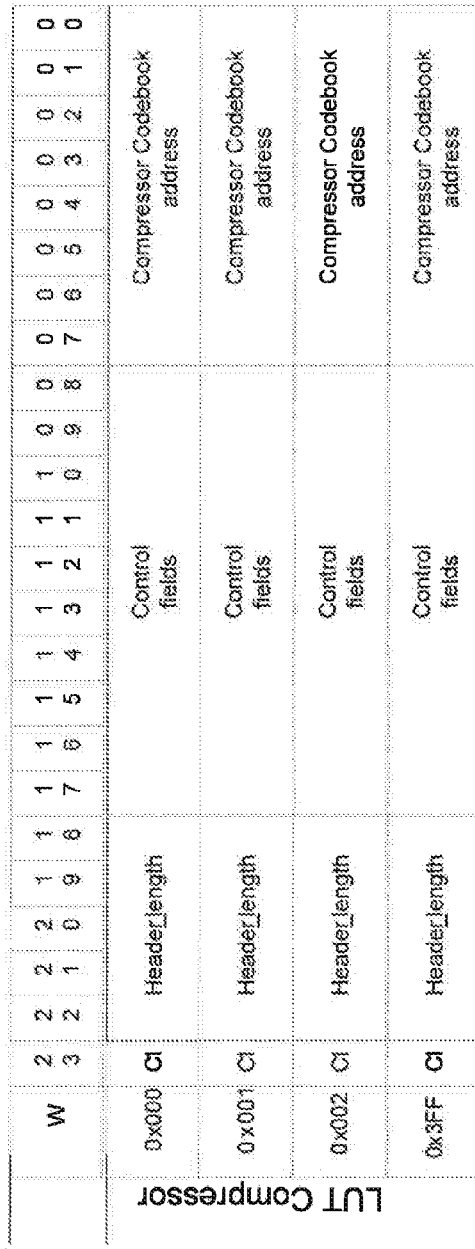
FIG. 12 illustrates a compressor look-up table according to an embodiment.

An example of a Compressor look-up table is shown in FIG. 12. Here, Compressor LUT address is the hash key. The field C1 indicates whether that the entry is valid and can be used for compression, for example by a 1 indicating valid, i.e. the corresponding entry has been created at de-compression side. "Header length" allows storing the length in bytes of compressible header that in one embodiment is limited to 32 packed bytes. In order to support a bigger number of bytes and/or non-packed fields in different patterns, one can simply use a different encoding of this field and/or extending its width. For example, in another embodiment supporting only compression of packed headers, the length of the header could be encoded with fewer bits than pictured in FIG. 12. Control fields can be used to handle multiple hashing collisions. In an embodiment, a Compressor Codebook address represents both the address of an entry descriptor and record, containing stored uncompressed data and the Single Code, transmitted in the compressed frames and used by the Decompressor for reconstructing the original header. In that embodiment, the Codebook is limited to 256 entries.

Figure 13:
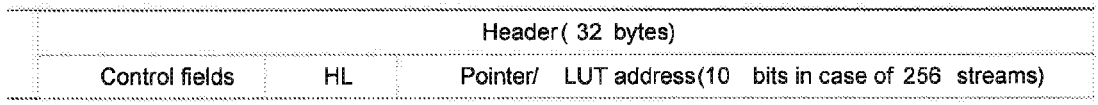
FIG. 13 illustrates a compressor codebook according to an embodiment.

FIG. 13 shows an entry in the Compressor Codebook, as implemented in an embodiment, where a 32-byte record and a descriptor are always associated to the same address. The "Header" record stores all the relevant fields in the compressible header. In an embodiment the header length is limited to 32 bytes but depending on the network configuration, the header length can be increased, increasing compression efficiency or decreased, decreasing memory occupation. Here, "Pointer/LUT address" field represents, if the present entry contains a valid header, the content of this field points to the corresponding entry in the LUT (10 bits), needed in case of entry removal. If the present entry is empty, Pointer field implements a linked list and it is used to point to the next free entry (9 bits) and is used by Compressor Table Manager during entry insertion and removal operations.

After reset, each entry in the codebook is initialized as the following: entry 0 has Pointer=1, entry 1 has Pointer=2 and so on; the last one has a NULL pointer (all ones over 8 bits). Furthermore, a hardware register, local to Search Engine, shall point to the first available entry (i.e. =0 after reset).

In case of insertion of a new entry, the Compressor Table Manager gets from local register the address of the first available free entry. After entry insertion, the field "Pointer" (that is read from location where the new entry has been added) is used to update the local register, so that this address points to the new first available entry and shall be used for the next operation.

In case of entry removal, the value read from the local register shall be written into the field pointer of the removed entry in order to concatenate it to the other following free entries. Then the address of the most recently removed entry becomes the first available entry and written into the local register.

Presence of NULL pointer in the local register also triggers a signal to stop further requests for new entries from the compressor machine, as in that case they cannot be completed.

"Control fields" are used internally by Compressor Table Manager (e.g. indicates if the entry is valid and can be used) and can include the type of header, highlighting different protocols, etc. Here, "HL"="Header_Length" allows storing the length in bytes of compressible header.

In another embodiment, in case the number of compressible headers is very low, e.g. 16, a different search method can be executed, avoiding hashing and look-up table utilization.

A direct comparison of compressible headers is possible parallelizing the comparisons or an ordered list of compressible headers that allows a binary search.

In both cases the embodiment does not need to include any look-up table and also handling of collision is avoided. These embodiments are not applicable in case of a high number of compressible headers due to the implementation complexity.

Figure 14:
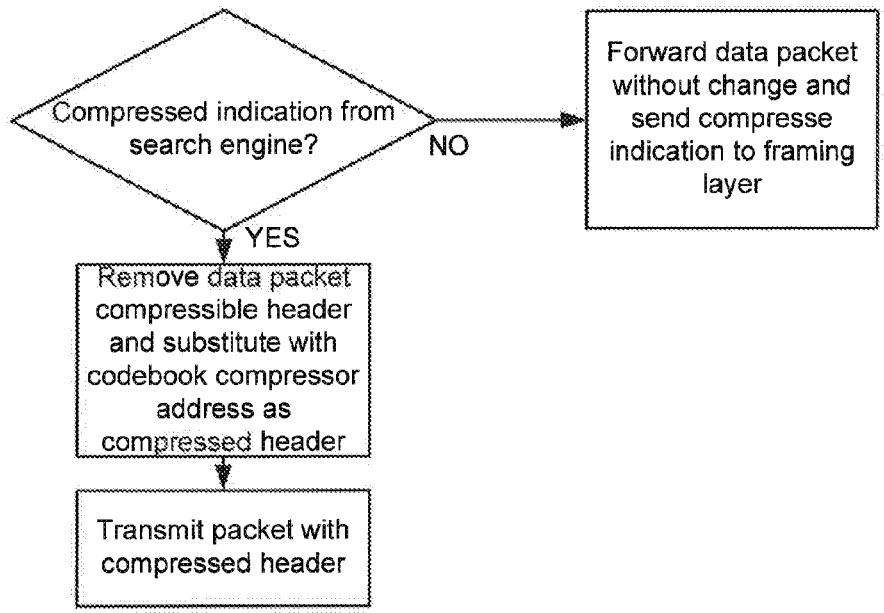
FIG. 14 is a flow chart illustrating actions of a compressor assembler according to an embodiment.

As shown in FIG. 14, the Compressor Assembler executes all the operations needed to form and send the compressed packet towards the Framing layer. In case the Search Engine sends a negative compression indication, Compressor Assembler forwards the traffic packet without any change along with the negative compression indication towards the Framing layer.

In case the Search Engine sends a positive compression indication, Compressor Assembler replaces the traffic packet compressible header with the compressed header provided by Search Engine and forwards positive compression indication and compressed packet towards the Framing layer.

The Framing layer assures the transport of positive or negative compression indication, which can be a 1 bit information.

In a typical Radio Access Network, the framing layer grants the transport of the data packets over physical layer, executing the framing delineation functionality. Transporting the compressed/uncompressed indication on the framing layer avoids any additional penalty in case of transport of uncompressed packets, allowing to the compression method to grant always an increased or maximum equal efficiency respect to the transport without any compression.

The Compressor Table Manager performs all the required steps to insert or re-initialize entries in the compressor and decompressor codebooks, keeping them aligned all the time, using control signalling Compressor Table Manager sends commands towards the Decompressor Table Manager and receives feedback from Decompressor Table Manager.

In an embodiment, the Compressor Table Manager always acts as master for the codebooks alignment, while the Decompressor Table Manager can transmit two different feedback messages in reply to Compressor commands:

ACK to acknowledge the codebook operations (needed for each action in reliable mode)

NAK to flag an anomaly or a misalignment between Compressor and Decompressor Codebooks In case of new compressible header signalled by Search Engine, the Compressor Table Manager starts signalling to update compressor and decompressor codebooks entries.

Figure 16:
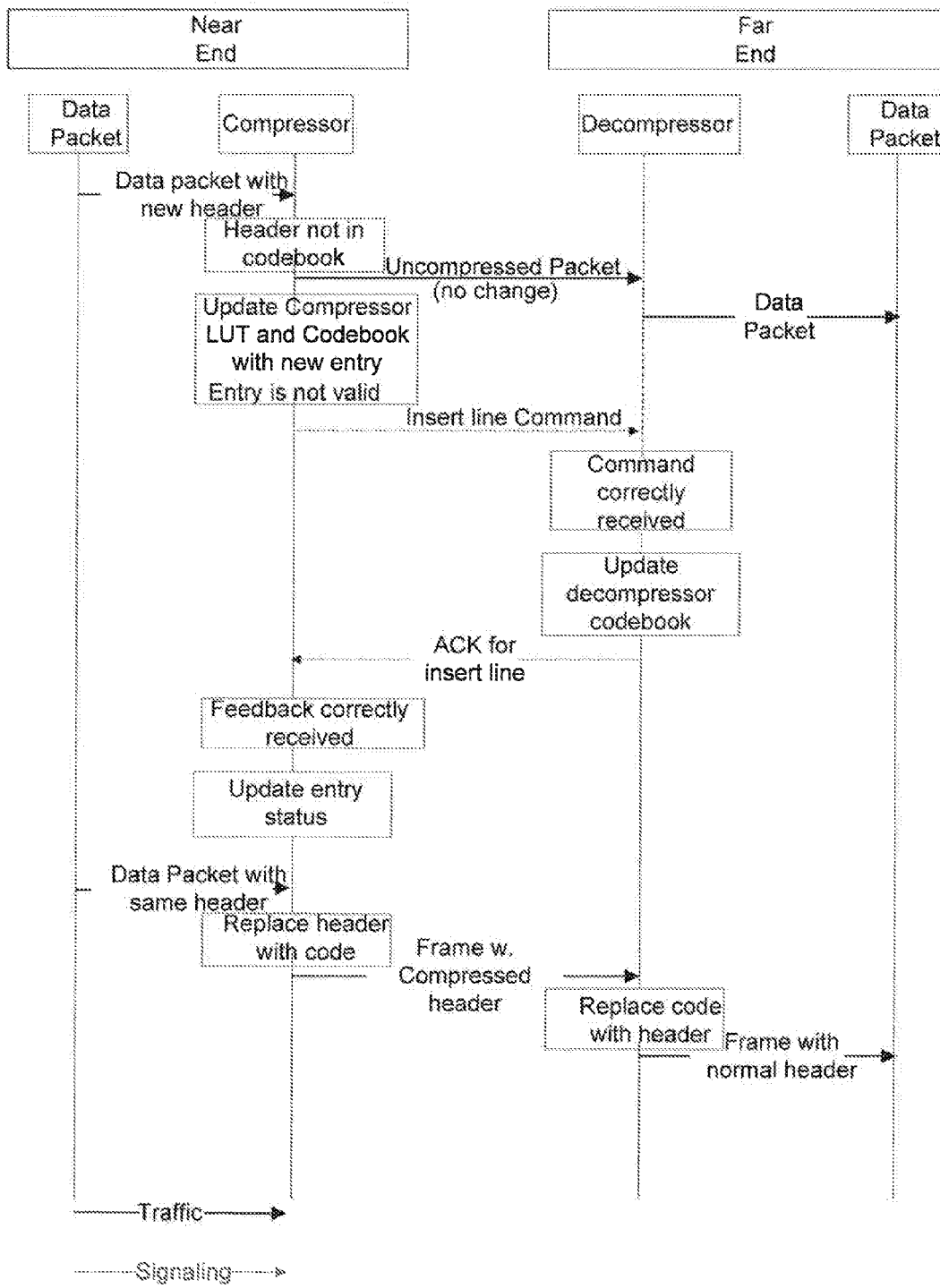
FIG. 16 is a signal diagram illustrating traffic and signalling upon a new codebook entry insertion.

FIG. 16 shows the flow chart for the insertion of a new entry.

Compressor Table Manager receives a request from Search Engine to insert a new compressible header in Compressor's tables.

Compressor Table Manager adds this new entry in Compressor's LUT and Codebook, along with Negative-Valid indication; this means that incoming traffic with the same header is not compressed at this time.

The Compressor Table Manager sends to the Decompressor Table Manager a signalling packet, including a command to insert a new entry in the Decompressor Codebook, consisting of the original header and the associated Single Code.

The Decompressor Table Manager checks the received command and in case it is correct, updates the Decompressor Codebook.

The Decompressor Table Manager adds the new header at the address specified by the compressor codebook address. At this point, compressor and decompressor have aligned, and new entries in their respective codebooks are waiting to be declared Valid.

The Decompressor Table Manager sends back to the compressor table manager a positive acknowledge that the insertion is correctly executed, including the actually inserted header and code.

The compressor table manager checks the received acknowledge and if it is correct, updates the Valid fields in the Codebook, allowing the compressor to start sending compressed packets.

This method can be based on a reliable exchange of the control signalling information between compressor and decompressor table manager. This signalling need not be included inside the data packets, enabling increased implementation flexibility.

The reliable method is more robust respect to the unidirectional method in case of errors, but undetected errors in the control signalling, updating decompressor codebook entries can lead to several errors during decompression.

In an embodiment, the control signalling is transmitted as in-band packets.

FIG. 17 shows a generic format of the signalling packet. Command type specifies the type of command or the type of feedback. Control fields are used to transport control information to check the alignment between compressor and decompressor codebooks; the compressor codebook address and header information are required only in case of insertion of a new entry. Each packet is protected by CRC, which makes the probability of wrong signalling packets misinterpreted very low.

Only signalling commands with a correct CRC but wrong content can lead to compressor and decompressor codebooks misalignment. In case the decompressor table manager receives a signalling packet with errors but with a correct CRC, a wrong insertion in the decompressor codebook can cause errors on the compressed traffic streams. To avoid a possible mismatch of compressor and decompressor codebooks, in case of errors detected by wrong CRC or due to missing or wrong acknowledge, the compressor table manager can remove all the compressor codebook entries from the memories tables, and sending traffic streams as uncompressed; the same behaviour is foreseen in case of physical alarms on the traffic path like excessive BER, LOS, or RDI if available, that highlight a severed error condition.

This method allows minimizing errors at decompressor, due to erroneous hop communication, respecting to the unidirectional, granting a more reliable alignment of the compressor and decompressor codebooks.

The compressor memories tables' initialization is equivalent to a reset of the compressor state machine in case of errors, clearing all the possible entries and makes possible to store new entries that in errors condition are sent by Mobile Backhaul nodes; in case of communication errors between MBH nodes, MBH signalling becomes relevant respect to the total data packets. MBH signalling mainly includes packets with short length (64 bytes) that, if compressed, maximize the possible compression gain.

In this case, the reset of compression machine allows storing quickly the new entries.

In another embodiment, the robustness of the insertion procedure can be increased, allowing the insertion of a new entry in the decompressor codebook only after the reception of more than one command by compressor table manager. In case of in-band control signalling, the maximum rate of the control signalling is limited, avoiding an excessive capacity occupation which would reduce the traffic capacity.

In another embodiment of the present invention the control signalling is transmitted over dedicated channels, relying on different protection mechanism.

The compressor table manager executes a periodical check of the decompressor codebook alignment, preventing codebooks misalignment due to restart or other errors condition at decompressor. Compressor table manager commands include fields updating the decompressor table manager on the status of compressor codebook (e.g. compressor codebook not empty).

In case of misalignment detected, decompressor table manager sends a NAK that causes the compressor table manager to remove all the entries from the compressor codebook.

In case of no feedback received the compressor table manager can decide to remove all the entries from the compressor codebook, e.g. after timeout expiration.

The compressor table manager can check the aging of the entries in the compressor LUT and codebook, removing unused entries after timeout expiration.

In another embodiment, the aging is executed by removing entries with rates lower than a fixed threshold.

Figure 15:
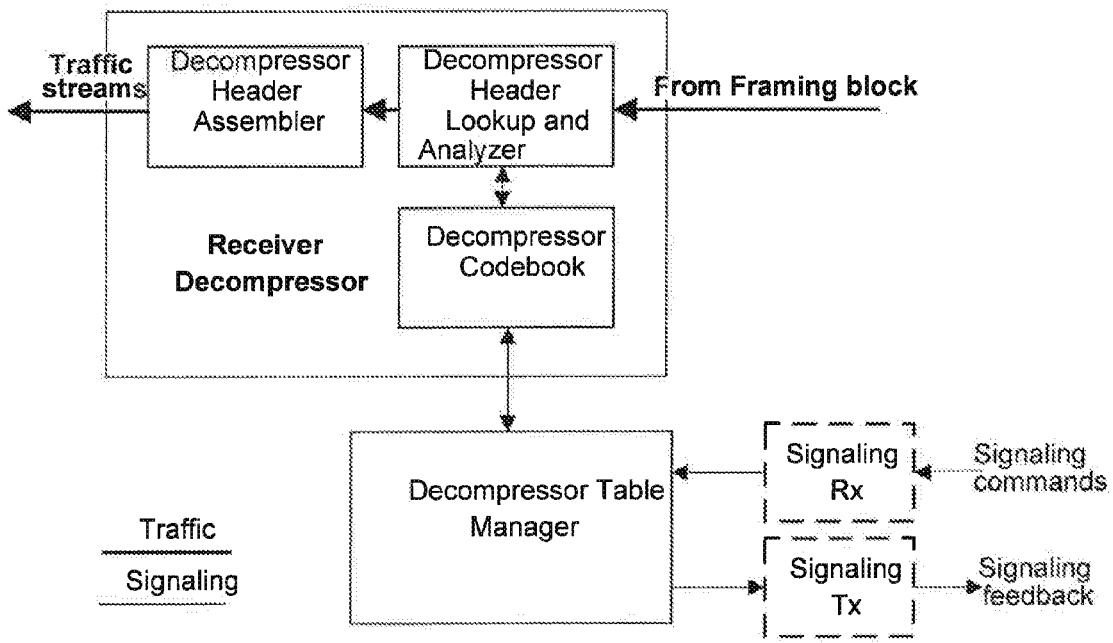
FIG. 15 is a block diagram illustrating decompressor functions according to an embodiment.

FIG. 15 describe the decompressor blocks that process traffic fed by the framing blocks, executing the following tasks, highlighted in FIG. 18.

Decompressor Header Analyzer and Look-up retrieves the compressed or uncompressed information from the framing layer. In case of incoming uncompressed packets, it forwards the packet to the decompressor header assembler, including the uncompressed information. In case of incoming compressed packets, it extracts the compressed header, retrieves the original header format from decompressor codebook at the address specified by compressor codebook address in the compressed header and forwards this information towards the decompressor assembler.

The decompressor assembler, in case of uncompressed packets, forwards the packets unchanged, in case of compressed packets, removes the compressed header and substitutes it with the header provided by Decompressor Header Analyzer and look-up, reconstructing the original packet.

FIG. 19 shows a decompressor codebook. Here, record "Header" stores all the relevant fields in the compressible header, and field "Control fields" are used by decompressor table manager to check entries validity and can includes the type of header, highlighting different protocols. Field "HL"="Header_Length" allows storing the length in bytes of compressible header that in an embodiment is limited to 32 bytes.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of transmitting data packets comprising:
acquiring a data packet to be transmitted;
parsing the data packet to extract at least a part of its header;
matching the extracted part of the header with header items stored in a code book database; and
transmitting, if the extracted part of the header does not match a header item stored in the code book database, the data packet without adaption, or
preparing, if the extracted part of the header matches a header item stored in the code book database, an adapted data packet comprising a code from the code book corresponding to the match replacing the at least part of the header, and the rest of the data packet, and transmitting the adapted data packet, wherein
the method further comprises performing the following steps if the extracted part of the header does not match a header item stored in the code book database:
assigning a new header item in the code book comprising a code and the header;
preparing a code book packet comprising the assigned code and the extracted part of the header; and
transmitting the code book packet.

2. The method according to claim 1, further comprising performing, if the extracted part of the header does not match a header item stored in the code book database, wherein the code book database is representing the header items with hash values of the part of the corresponding header, the steps of:
calculating a hash value for the extracted part of the header;
determining whether a collision between the calculated hash value and any of the stored hash values of the code book database occurs by matching the calculated hash value to the stored hash values; and
performing, if no collision is determined, the steps of:
assigning a new header item in the code book comprising a code and calculated hash value of the header;
preparing a code book packet comprising the assigned code and the extracted part of the header; and
transmitting the code book packet.

3. The method according to claim 2, wherein the stored hash values further are assigned with an index, wherein if the calculated hash value matches a stored hash value, it is determined whether a further index is free for that hash value, wherein
if no further index if free for that hash value, a collision is determined, and
if a further index is free for that hash value, no collision is determined and the assigning of a new header item assigns the free index to the calculated hash value.

4. The method according to claim 1, further comprising:
receiving an acknowledgement signal for a previously sent code book packet;
determining whether the acknowledgement signal indicates an ACKnowledgement or a Negative AcKnowledgement; and
storing the assigned new header item in the code book database only if an ACKnowledgement is indicated.

5. The method according to claim 1, further comprising:
deleting a header item of the code book database if the header item has not been accessed for the preparing of an adapted data packet for a predetermined time, wherein the time is preferably measured in absolute time or number of packet transmissions.

6. The method according to claim 5, further comprising, upon deleting a header item, transmitting a code book packet comprising a deletion notice for the header item.

7. The method according to claim 1, wherein the at least part of the header is defined by invariant fields statistically determined to be occurring in a multitude of packets.

8. The method according to claim 7, wherein the data packet is an Ethernet packet or of type IEEE802.3 and derivations thereof, and the invariant fields comprise Ethernet MAC destination address, Ethernet MAC source address, Ethernet type, zero or multiple additional VLAN customer tag, zero or one additional VLAN service tag, and zero or multiple additional MPLS tags.

9. The method of claim 1, further comprising:
receiving a data transmission;
determining whether the data transmission comprises a compressed header indicator for a data packet with a compressed header by parsing the data transmission; and
if the data packet is determined to comprise a compressed header, performing the steps of:
parsing the data packet to extract a code;
looking up a code book database using the extracted code to find corresponding header data; and
decompressing the data packet by replacing the compressed header indicator and the extracted code by the header data, or
if no indicator is found, outputting the data packet without decompression processing.

10. A computer program for a transmitter for transmitting data packets, the computer program comprising instructions, which when executed by a processor of the transmitter, causing the transmitter to perform the method according to claim 1.

11. A method of receiving data packets comprising:
receiving a data transmission;
determining whether the data transmission comprises a compressed header indicator for a data packet with a compressed header by parsing the data transmission; and
if the data packet is determined to comprise a compressed header, performing the steps of:
parsing the data packet to extract a code;
looking up a code book database using the extracted code to find corresponding header data; and
decompressing the data packet by replacing the compressed header indicator and the extracted code by the header data, or
if no indicator is found, outputting the data packet without decompression processing, wherein
the method further comprises performing the following steps if the data transmission is determined not to comprise a compressed header indicator:
determining whether the data transmission corn irises a code book packet; and
if the data transmission comprises a code book packet, performing the steps of:
extracting a code part and a header part from the code book packets; and
storing in the code book database a header item in the code book database using the extracted code part and the header part.

12. The method according to claim 11, further comprising transmitting an acknowledgement signal for a received code book packet, the acknowledgement signal indicates an ACKnowledgement or a Negative AcKnowledgement, wherein the AcKnowledgement indicates successful storing of the new header item in the code book database.

13. The method according to claim 11, further comprising, upon receiving a code book packet comprising a deletion notice for a header item, deleting the header item of the code book database corresponding to the header item.

14. A computer program for a receiver for receiving data packets, the computer program comprising instructions, which when executed by a processor of the receiver, causing the receiver to perform the method according to claim 11.

15. A transmitter arranged for transmitting data packets comprising:
a data input arranged to acquire a data packet to be transmitted;
a parser arranged to parse the data packet to extract at least a part of its header;
a code book database enabling storing of header items by association to codes, respectively, under control of a code book handler;
a search mechanism arranged to match the extracted part of the header with header items stored in the code book database;
a compressing mechanism arranged to, if the extracted part of the header matches a header item stored in the code book database, prepare an adapted data packet comprising a code from the code book corresponding to the match replacing the at least part of the header, and the rest of the data packet; and
a radio transmitter arranged to transmit the adapted data packet, if an adapted data packet is prepared, or the data packet without adaptation if the extracted part of the header does not match a header item stored in the code book database, wherein
the code book handler is arranged to, if the extracted part of the header does not match a header item stored in the code book database, assign a new header item to the code book comprising a code and the header, prepare a code book packet comprising the assigned code and the extracted part of the header, wherein the radio transmitter is arranged to transmit the data packet and the code book packet.

16. The transmitter according to claim 15, wherein the code book handler is arranged to, if the extracted part of the header does not match a header item stored in the code book database, wherein the code book database is representing the header items with hash values of the part of the corresponding header, calculate a hash value for the extracted part of the header, determine whether a collision between the calculated hash value and any of the stored hash values of the code book database occurs via the search mechanism matching the calculated hash value to the stored hash values, and, if no collision is determined, assign a new header item in the code book comprising a code and calculated hash value of the header, and prepare a code book packet comprising the assigned code and the extracted part of the header, wherein the radio transmitter is arranged to transmit the data packet and the code book packet.

17. The transmitter according to claim 16, wherein the stored hash values further are assigned with an index in the code book database, wherein the code book handler is further arranged to, if the calculated hash value matches a stored hash value, determine whether a further index is free for that hash value, wherein if no further index if free for that hash value, a collision is determined, and if a further index is free for that hash value, no collision is determined and the code book handler assigns the free index to the calculated hash value.

18. The transmitter according to claim 15, further comprising a receiver arranged to receive an acknowledgement signal for a previously sent code book packet for determination whether the acknowledgement signal indicates an ACKnowledgement or a Negative AcKnowledgement, wherein the code book handler is arranged enable storing of the assigned new header item in the code book database only if an ACKnowledgement is indicated.

19. The transmitter according to claim 15, wherein the code book handler is further arranged to delete a header item of the code book database if the header item has not been accessed for the preparing of an adapted data packet for a predetermined time, wherein the time is preferably measured in absolute time or number of packet transmissions.

20. The transmitter according to claim 19, wherein the code book handler is further arranged to, upon deletion of a header item, prepare a code book packet comprising a deletion notice for the header item, and the radio transmitter is arranged to transmit the code book packet.

21. The transmitter according to claim 15, wherein the at least part of the header is defined by invariant fields statistically determined to be occurring in a multitude of packets.

22. The transmitter according to claim 21, wherein the data packet is an Ethernet packet or of type IEEE802.3 and derivations thereof, and the invariant fields comprise Ethernet MAC destination address, Ethernet MAC source address, Ethernet type, zero or multiple additional VLAN customer tag, zero or one additional VLAN service tag, and zero or multiple additional MPLS tags.

23. A communication system for data transmissions comprising: a transmitter according to claim 15.

24. A receiver for receiving data packets comprising:
a radio receiver arranged to receive a data transmission;
a parser arranged to determine whether the data transmission comprises an indicator of a data packet with a compressed header, wherein, if the data packet is determined to comprise a compressed header, the parser is further arranged to parse the data packet to extract a code;
a code book database enabling storing of header items by association to codes, respectively, under control of a code book handler;
a search mechanism arranged to match the extracted code to header items stored in the code book database;
a decompression mechanism arranged to, if a match was made, replace the compressed header indicator and the extracted code by header data acquired from the code book database such that the data packet with the header data is output, wherein
the parser is arranged to determine whether the data transmission coin rises a code book packet and if the data transmission comprises a code book packet, extract a code part and a header part from the code book packet wherein the code book handler is arranged to store an header item in the code book database using the extracted code part and the header part.

25. The receiver according to claim 24, further comprising a transmitter for transmitting an acknowledgement signal for a received code book packet, the acknowledgement signal indicating an ACKnowledgement or a Negative AcKnowledgement, wherein the AcKnowledgement indicates successful storing of the new header item in the code book database.

26. The receiver according to claim 24, wherein the code book handler is further arranged to, upon receiving a code book packet comprising a deletion notice for a header item, delete the header item of the code book database corresponding to the header item.

\* \* \* \* \*